UNITED STATES PATENT OFFICE.

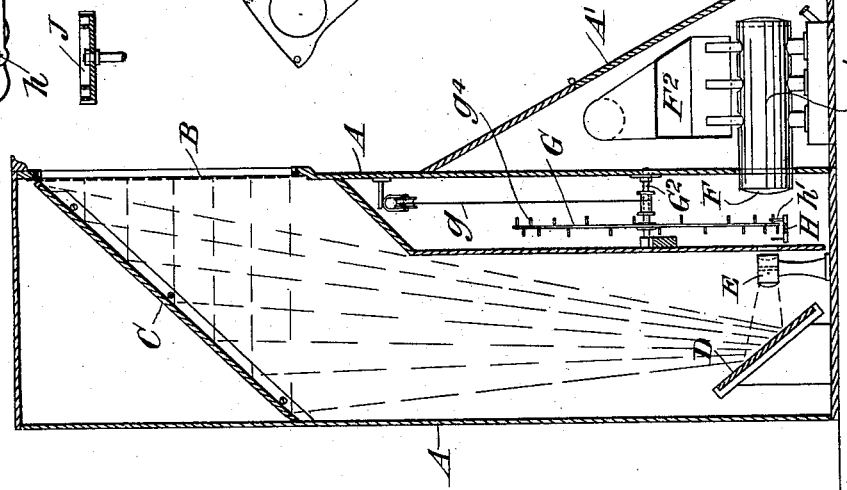

LOUIS HENRY HART, OF MELBOURNE, VICTORIA.

SELF-ACTING STEREOPTICON.

SPECIFICATION forming part of Letters Patent No. 578,511, dated March 9, 1897.

Application filed September 22, 1896. Serial No. 606,659. (No model.)

*To all whom it may concern:*

Be it known that I, LOUIS HENRY HART, gentleman, a citizen of the United States, and a resident of No. 325 Collins Street, Melbourne, in the British Colony of Victoria, have invented a certain new and useful Improved Self-Acting Stereopticon, of which the following is a specification.

The particular features of the invention will be hereinafter fully described, and specifically set forth in the claims.

The invention will now be described, aided by a reference to the accompanying sheet of drawings, in which—

Figure 1 shows a front view of the stereopticon with its casing partly broken away in front of the wheel or disk which carries the slides or pictures in order to exhibit their position; and Fig. 2, a sectional view taken on line $x\,x$ of Fig. 1, while Fig. 3 is a front and sectional view of the lamp-casing and showing the flues leading from lantern-chimney. Figs. 4 are enlarged details of the disk-wheel which carries the slides or pictures and its attached winding-drum and ratchet-gear, and Figs. 5 are enlarged details of the lever and cam escapement-gear for the said disk.

The preferred form of the invention consists of a portable case or casing A, having at its front near its top an opening over which is stretched a screen B, formed of some semi-transparent material, such as ground glass, tracing-cloth, or other suitable material. At the back of said screen or disk, inside the casing, is a reflector or mirror, of silvered plate-glass C, arranged at an angle of forty-five degrees from face of said screen or disk, the bottom edge of said mirror being on a level with the bottom of screen, while the top edge of mirror is almost in contact with the top edge of disk. Directly underneath the top mirror C and at such a distance below it as will be necessary to suit the focal length of the lens employed is another mirror or prism D of smaller area than the upper one, and this lower mirror or prism also lies at an angle of forty-five degrees with its inclination in the opposite direction to that of the top mirror, as shown. On a level with the center of the lower mirror or prism D is a lens E of suitable focal length, arranged in such a position that it will cause the rays of light from a condensing-lens F of a suitable lantern F' to be gathered and projected to the face of the lower mirror or prism D, which then reflects the rays of light to the top mirror C, from which it is projected to the screen or disk B. Consequently any picture or advertisement painted or photographed or by any other process produced as a transparency and which is passed between the lens E and the lantern condenser-lens F will be displayed in an enlarged size upon the screen or disk B.

The pictures or advertisements to be displayed are preferably in the form of a number of slides G', carried by a disk-wheel G, of metal, wood, or other material, mounted on a suitably-supported spindle $G^2$, said wheel being caused to rotate in a plane parallel with the front of casing by the weighted cord $g$, being supported by sheaves and having its end secured to the drum $g'$ on spindle $G^2$, said drum being attached to the disk by ratchet-and-pawl gear $g^2$, as shown in Fig. 4, and in which figure the pictures or slides G' are shown secured over holes in the edge of disk G by small clamps $g^3$. The length of time which each picture will remain between the lenses is determined by an escapement-lever H, centered at H' and controlled by a cam or eccentric J, which is rotated by any suitable clockwork-gear or by a spring or other suitable motive power. The lever H has a pin $h$ on its end which works in a race in the cam J, while the other end of lever is formed like a T and has two small pins $h'$ projecting from it, and such pins alternately engage pins or stops $g^4$, arranged at regular intervals on alternate sides of the disk or wheel G. It will thus be understood that the weighted cord $g$ imparts motion to the disk G, while the disk is held stationary and in position, with the picture or slide between the lens, by one of the pins $h'$ on the vibrating escapement-lever H engaging one of the stop-pins $g^4$ on the disk, the cam J holding it thereat for the predetermined period of time and also releasing the pins in order to allow the disk to partially rotate and bring the next slide into position. The lantern F' is shown arranged in a covering A' at front of the casing A, while $F^2$ is a split flue leading to both sides of the said covering.

Having described herein and shown in the drawings one practical means of arranging and constructing my self-acting stereopticon, I wish it understood that I do not confine myself to the precise contrivances and gears described and shown, as, for instance, an endless carrier may be substituted for the disk G and other parts may be modified; but What I do claim as new, and desire to secure by Letters Patent, is—

1. In combination with the upright casing, having a screen B in its upper front face, the reflector in rear of said screen, the reflector at the lower part of the casing, the slide-carrying wheel turning on a horizontal axis at the front of the casing, means for moving and controlling the carrier, the casing A' extending forward from the lower part of the main casing and the lantern in said forward extension, substantially as described.

2. In combination, the main casing having the screen in its upper front face, the reflector C in rear thereof, the lower reflector D, the chamber at the lower front part of the casing, the slide-carrier arranged therein, the casing A' at the front of the main casing, the lantern therein and the split flue leading from the lantern to both sides of the casing A', substantially as described.

In witness whereof I have hereunto set my hand in presence of two witnesses.

LOUIS HENRY HART.

Witnesses:
BEDLINGTON BODYCOMB,
W. J. S. THOMPSON.